United States Patent
Gross et al.

(10) Patent No.: US 6,918,082 B1
(45) Date of Patent: Jul. 12, 2005

(54) ELECTRONIC DOCUMENT PROOFING SYSTEM

(75) Inventors: Jeffrey M. Gross, 212 Union St., Brooklyn, NY (US) 11231; Matthew H. Parker, Brooklyn, NY (US)

(73) Assignee: Jeffrey M. Gross, Brooklyn, NY (US)

(*) Notice: Subject to any disclaimer, the term of this patent is extended or adjusted under 35 U.S.C. 154(b) by 696 days.

(21) Appl. No.: 09/215,593

(22) Filed: Dec. 17, 1998

(51) Int. Cl.[7] .............................................. G06F 15/00
(52) U.S. Cl. ..................................... 715/511; 715/530
(58) Field of Search ............................... 707/511, 530; 715/511, 530

(56) References Cited

U.S. PATENT DOCUMENTS

| | | | | |
|---|---|---|---|---|
| 5,008,853 A | * | 4/1991 | Bly et al. ................... | 345/751 |
| 5,220,657 A | * | 6/1993 | Bly et al. ................... | 711/152 |
| 5,438,661 A | * | 8/1995 | Ogawa ....................... | 345/804 |
| 5,790,790 A | * | 8/1998 | Smith et al. ................ | 709/206 |
| 6,065,026 A | * | 5/2000 | Cornelia et al. ............ | 707/511 |
| 6,088,702 A | * | 7/2000 | Plantz et al. ............... | 345/733 |
| 6,301,592 B1 | * | 10/2001 | Aoyama et al. ........... | 707/511 |
| 6,349,287 B1 | * | 2/2002 | Hayashi ...................... | 707/511 |

OTHER PUBLICATIONS

Ivan Anthony Walsh, Adobe Acrobat 3.0, Adobe Acrobat Review, http://www.desktoppublishing.com/reviews/acrobat–1.html, 1993.*
Tubleweed Software (Web Page) POSTA by Tumbleweed Software, Aug. 17, 1998.

* cited by examiner

Primary Examiner—Joseph Feild
Assistant Examiner—R Singh
(74) Attorney, Agent, or Firm—St. Onge Steward Johnston & Reens LLC (57) ABSTRACT

A system is provided for proofing electronic documents delivered over a network. The system comprises a plurality of electronic documents in portable document file format, a computer connectable to the network for receiving the plurality of portable format documents together with at least one associated proofer identifier, a program executing on the computer for assigning a version number to each of the plurality of received portable format documents, and a database accessible by the computer for storing the documents and associated version numbers. The computer for receiving a request, from a proofer presenting the proofer identifier, to review a portable format electronic document, and the program for retrieving and formatting the requested document for display.

21 Claims, 4 Drawing Sheets

ELECTRONIC DOCUMENT PROOFING SYSTEM

FIELD OF THE INVENTION

The invention relates to software and systems that allow multiple users to collaboratively proof, annotate, and edit multiple versions of documents over a computer network.

BACKGROUND OF THE INVENTION

The development of standardized and universally adopted computer networks such as the Internet or corporate intranets based on Transport Control Protocol/Internet Protocol ("TCP/IP") has provided a new compatibility previously unavailable for people using computers on isolated or incompatible computer networks. The widespread acceptance of TCP/IP networking and the use of software such as Web browsers now allows electronic files to be transmitted from one computer to another, regardless of computer platform or geographic location. Electronic mail ("email") and the ability to attach computer files to email is an example of such use.

Certain industries are now using computers as their primary tool for creating documents. Such industries include, but are not limited to, graphic design, illustration, product design, architecture, photography, and the legal industry, to name just a few. Software programs have been created to meet the particular needs of each industry, many of which create complicated electronic files based on complex page description languages such as, but not limited to the PostScript® page description language. Exchanging electronic files between document creator and the person or persons who must proof and approve the document often necessitates that both parties use the exact same software version, often running on the same computer operating system.

For example, a layout artist may use Quark Xpress® or Adobe PageMaker® to layout pages using graphical images taken from pixel-based imaging programs such as Adobe Photoshop® or vector-based programs such as Adobe Illustrator® or Macromedia FreeHand®. An architect may use a Computer Aided Design ("CAD") program appropriate to his or her work, and product designers may use their industry's preferred CAD software programs to create work that needs to be distributed to and/or proofed by another party, such as a client, or for peer review with colleagues within their own organization. Other professionals may use a particular brand of word processing software in a particular release on a particular platform. Although these programs may provide limited versioning capabilities they generally utilize proprietary, not portable document formats, typically do not enable simultaneous display and/or control of multiple document versions, and often do not include comment history capabilities.

Software solutions have been invented to allow document creators and document approvers (or proofreaders) to exchange computer files without regard to the original authoring software or computer platform. These solutions are often termed "portable document formats" and include, but are not limited to, Adobe System's Acrobat Portable Document Format, Envoy's portable document format, and FlashPix, a graphical file format created by the Digital Imaging Group, a consortium of nine leading imaging companies.

Portable document formats can be defined as computer file formats that describe a file created in any computer program, and allow a user to view the file, preserving its exact appearance, without need for the original authoring program. Converting a computer-generated file into a portable document format allows a document creator to send the computer file to another party to be viewed and, depending on the format, printed. Many portable document file formats preserve the original visual and print integrity of a complicated PostScript®-based document. Most portable document format reader programs or browser plug-ins are available for free download from the Internet and other computer networks. Others use widely supported programming languages, such as the Java programming language, and "virtual machines" to display files on a variety of operating systems. Although these products alleviate some of the platform, release dependence and proprietary format issues, problems of managing and tracking multiple versions of multiple documents being distributed to and proofed by multiple parties concurrently and asynchronously remain. The ability to compare current and past versions of a document onscreen or in print is a great help when distributing and proofing documents, yet is often difficult and confusing using conventional methods such as File Transfer Protocol ("FTP") to post files to a server or emailing multiple files to multiple document recipients. The capability of reviewers to change which is the current/preferred version of a document and/or to review a history of comments about each document version is also not provided.

Another significant obstacle to proofing documents with clients or colleagues over computer networks is that despite common network protocols such as the Internet, delivering portable documents over networks can be difficult. Incompatible email gateways can corrupt file attachments, and some corporate firewall technology does not permit file attachments at all. In addition, email is not always speedily delivered, as it has low priority for use of Internet bandwidth, and, further, is often not secure.

J. Smith, et. al. Electronic Document Delivery System in Which Notification of Said Electronic Document is Sent to a Recipient Thereof, U.S. Pat. No. 5,790,790, (4 Aug. 1998) discloses a network-based electronic document delivery system, which has a network server that stores electronic files to be accessed by email and file recipients. This disclosed prior art system may be characterized as a "push publishing" system of delivering documents using a server as a storage facility to hold documents. A document recipient receives a reference, in the form of electronic mail, which points directly to the file to be delivered on the server. Systems of this kind solve some problems with delivery of documents over a network, but do not provide features for collaborative production and review of documents.

The disclosed prior art systems and methodologies provide methods for the delivery of portable format documents over computer networks, but fail to provide a way to automatically display or track multiple versions of the electronic documents, to review and add to a history of comments about the particular version of the document displayed, to alter the current/preferred version of the document, or to simultaneously-display a particular document version and its current history. Nor do the disclosed prior art systems enable these capabilities for simultaneously managing multiple different projects and documents.

SUMMARY OF THE INVENTION

Accordingly, it is an object of the invention to provide a system which simultaneously displays multiple versions of portable format document over a computer network.

Another object of the invention is to provide a system enabling a collaborative reviewer to change a current version of a portable format document.

Still another object of the invention is to provide a system for simultaneously displaying a history of comments from collaborative reviewers together with each version of a portable format document.

Yet another object of the invention is to provide a system of the kind described above which is capable of providing this functionality to multiple reviewers of multiple versions of multiple documents.

One or more of these objects and advantages is achieved by the invention which provides a system for proofing electronic documents delivered over a network. The system comprises a plurality of electronic documents in portable document file format, a computer connectable to the network for receiving the plurality of portable format documents together with at least one associated proofer identifier, a program executing on the computer for assigning a version number to each of the plurality of received portable format documents, and a database accessible by the computer for storing the documents and associated version numbers. The computer receives requests, from proofers presenting the proofer identifier, to review a portable format electronic document, and the program retrieves and formats the requested document for display.

In some cases the request received by the computer is for multiple document versions, in which case the program formats multiple versions of a document for simultaneous display. The computer also receives comments submitted by proofers, in which case the program stores the comments together with the corresponding document version. When a document is requested for display the history of comments received for the document is preferably also simultaneously displayed. The computer also receives and interprets commands from authorized users. One such command is to change the current version of a document which is displayed by default to another version.

DETAILED DESCRIPTION OF THE INVENTION

Figure 1:
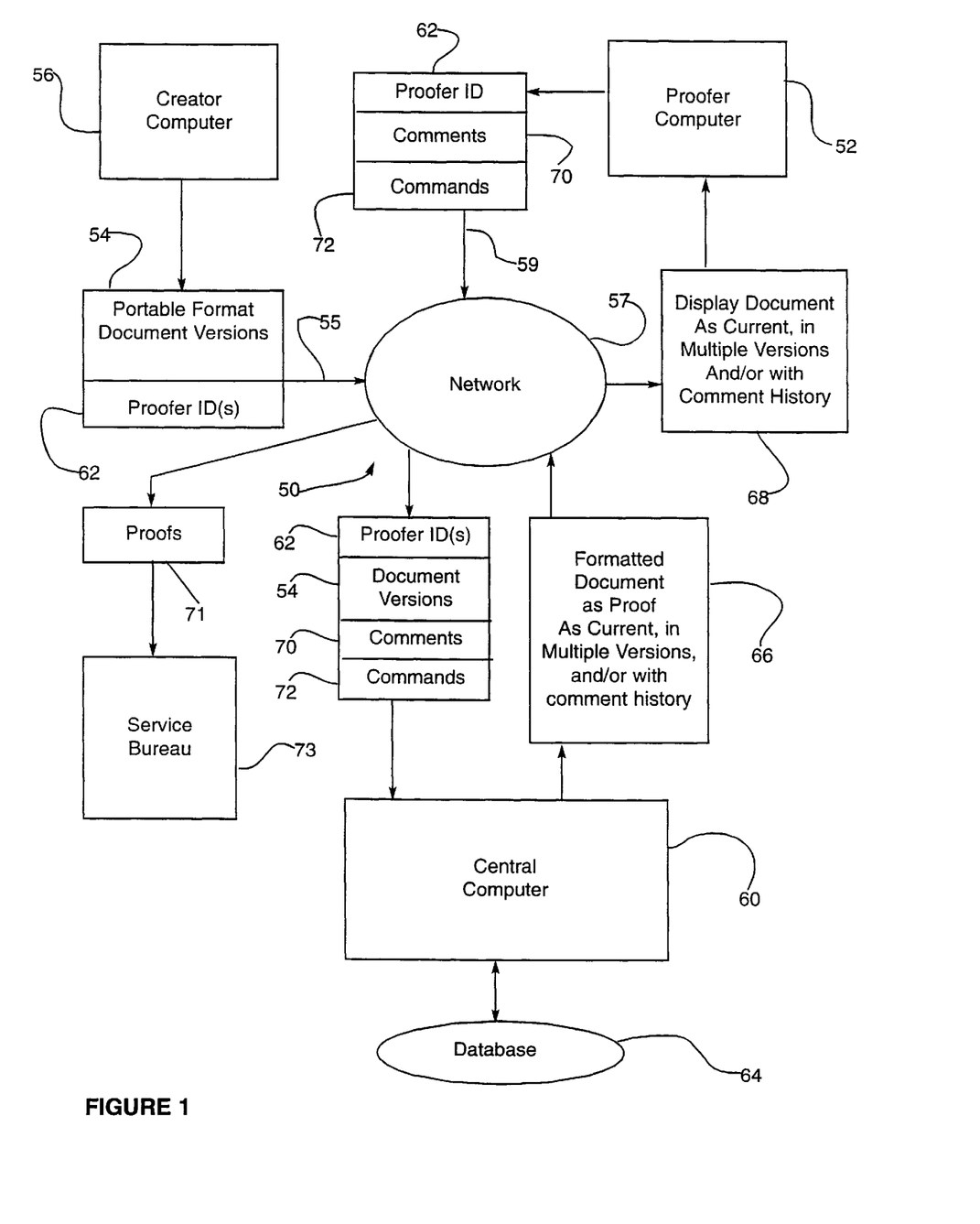
FIG. 1 is a block diagram depicting a system for proofing electronic documents in accordance with the invention.

FIG. 1 illustrates a system 50 in accordance with the invention for proofing, at proofer computer 52, portable format electronic document versions 54 created by creator computer 56. Documents 54 are received from creators 56 and made available to proofers 52 over a network 58 by central computer 60.

Creators 56 send document versions 54, along line 55, to central computer 60 together with proofer identifiers 62 which indicate who is authorized to view the document version for review and comment. Computer 60 assigns a version number to each received document version 54 and stores document versions together with their associated proofer identities 62 on a database 64.

Proofers 52 can obtain document versions 54 for review by presenting to computer 60 a proofer identification 62, along line 57, which authorizes them to access the document of interest. Upon receipt of an authorized request, computer 60 retrieves document versions 54 from database 64 and formats an appropriate response at 66 for display by proofer 52 as schematically indicated at 68.

Upon review of displayed document versions, proofers 52 may return comments 70 to central computer 60 for storage on database 64 together with the corresponding document version. Subsequent formatting and display of the same document version may thereby include a complete history of comments submitted by various other reviewers.

Ordinarily, upon receipt of an authenticated proofer request to review a document version, computer 60 will format the then current version of the document for display. As indicated at 66 and 68, however, proofer 52 may request multiple versions of a document for simultaneous review. In this case, it is understood that proofer 52 must provide a command or instruction 72 to central computer 60 indicating which of the multiple versions of a particular document are desired to be formatted for simultaneous display. In the preferred embodiment, this selection is accommodated by creators 52 supplying a description of each document version which is stored. Document descriptions may also be displayed with the document version.

After reviewing multiple versions of a portable format electronic document 54, proofer 52 may issue another command 72 to computer 62 instructing that the current version of a document be replaced with another, e.g., prior version of a document. The current version of a document is the one formatted for display to a proofer in the absence of a contrary command. Ordinarily, the current version is the version most recently received or "latest" version received from creator 56. New versions of documents are generally prepared by creator 56 in response to comments 70 on prior versions. In this regard, it is understood, though not illustrated, that creators 56 may also include or add comments on document versions, for example as replies to the comments of proofers 52. Creators 56 may also provide a document description which explains a document version 54 in terms of the comments 70 received on prior versions of the same document.

A further command 72 which may be issued by proofer 52 is an approval command. An approval command indicates to computer 60 that a document version is final and that a proof 71 may be forwarded to a service bureau or other third party, for example to print the document. Although not shown in the Figures, it is understood that creator 56 may issue all the same document specific commands as proofers 52. In addition, creators 56 may also be given permissions on computer 60 to issue administrative commands such as editing proofer identifiers and proofer permissions for a particular document, adding a new document to the system, and so on.

Figure 2:
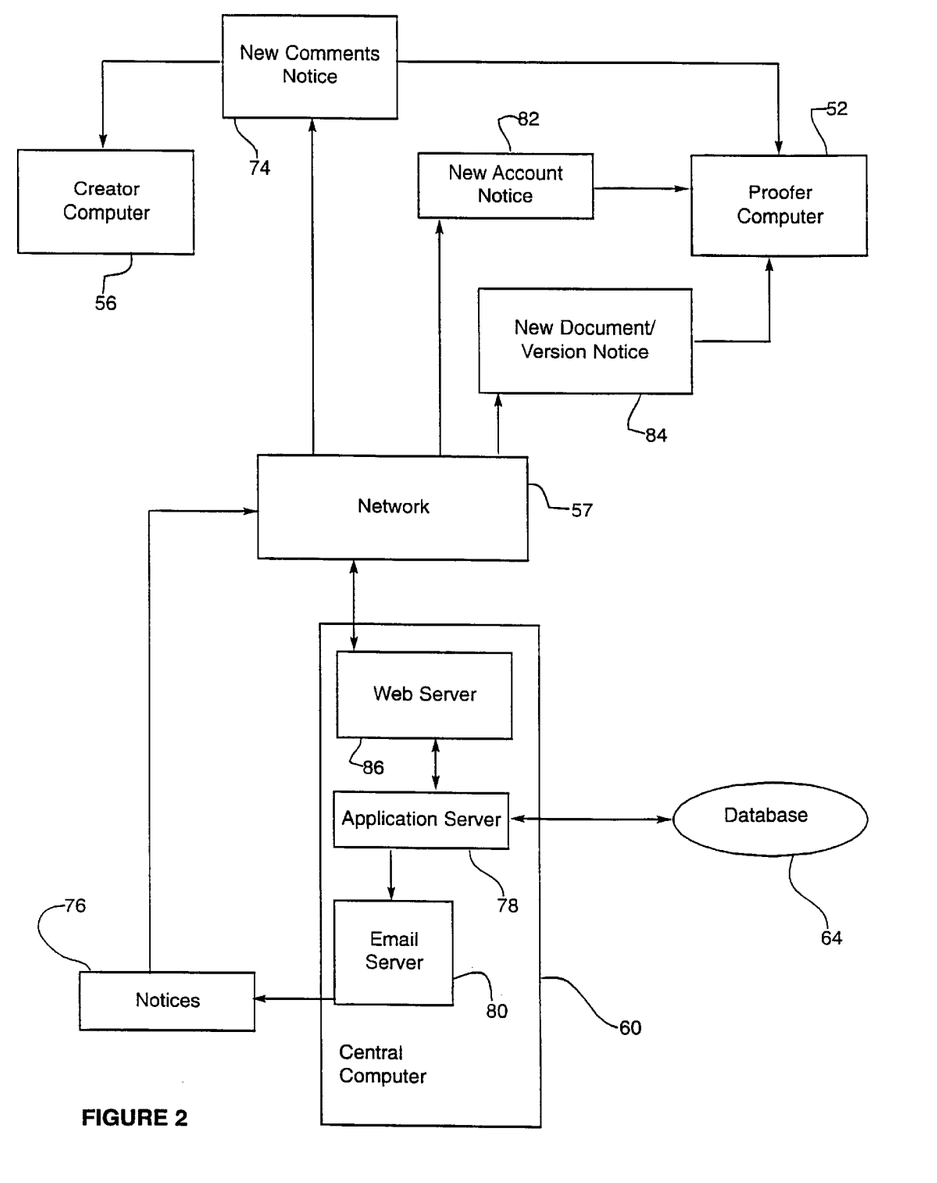
FIG. 2 is a block diagram illustrating the notice functions for a central computer in a proofing system of FIG. 1.

Referring now to FIG. 2, additional features and capabilities of system 50 are depicted including notification 74 to creators 52 and proofers 56 when new comments 70 are received by computer 60 on a document for which they are authorized. In the preferred embodiment of the invention the computer is a server cluster and notices 76 are email messages generated by application server 78 and distributed by email server 80. In addition to notifying, at 74, users of system 50 that new comments may be reviewed, notices inform proofers at 82 that a new account has been set up for them on computer 60, and at 84 that a new document or document version is available for review. In addition, or as an alternative, to these email notices, an inbox system may be used to alert users upon logging in to any new comments or documents awaiting review.

Server cluster 60 preferably includes a web server 86 and network 57 is preferably the internet or other TCP/IP protocol network such that documents are formatted by application server 78 in HTML or another markup language commonly used in browser software running on the proofer's computer. Comments and commands are also received and interpreted by application server 78 through web server 86 and users' browsers in the preferred embodiment.

Computer 60 utilizes a unique methodology for storing files on database 64 which enables system 50 to keep track of numerous versions of numerous documents in numerous projects for numerous clients. A hierarchy of directories is used on database 64 and/or application server 78 to store the actual documents. The directory hierarchy is generated from information about a particular document and is also used to formulate the URL for display of the document versions to proofers through a web browser. The storage methodology relies on the dynamic interaction between 3 types of entities: a relational database, a directory tree file storage system, and URL strings.

As document versions are uploaded into the system by creators, groups of proofers ("clients") are created, project names are input, version numbers are assigned, and so on. This information is used to uniquely represent or tag database records about the document versions (see FIG. 4). Simultaneously, a hierarchical system of directories is created in a tree structure using this information (see FIG. 3) to store the uploaded document versions.

Figure 3:
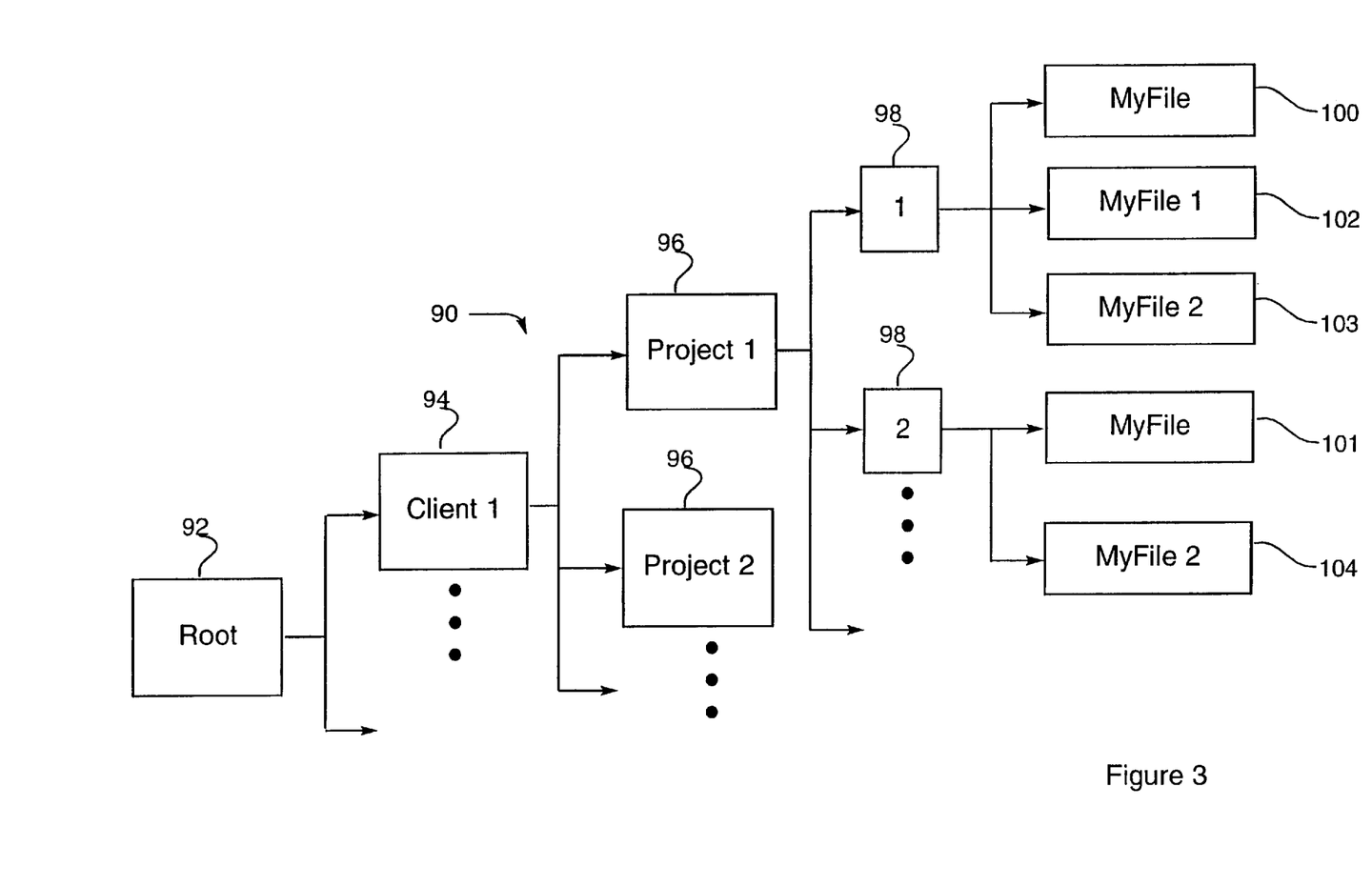
FIG. 3 is a block diagram illustrating a directory tree for the storage of documents on a database in a proofing system of FIG. 1.

Referring first to FIG. 3, tree structure 90 springs from a root directory 92 on database 64 and/or application server 78. One or more client directories 94 are created in root 92. The dots ". . . " indicate that there are multiple other possible directories. As alluded to above, a client is a unique group/collection of proofers. In this regard, it is understood that members of a client group may each have the same or different proofer identifiers.

Each client 94 may be assigned multiple proofing projects 96 each of which is created in a separate directory. Whenever a document version is uploaded to computer 60 directories 94 and 96 are created if they do not already exist, a version number is assigned to the document and a version directory 98 is created if necessary to store the document version. In the illustrated example, Client 1's Project 1 includes three different documents: MyFile, MyFile 1 and MyFile 2. The document named MyFile exists in two versions 100 and 101. The document named MyFile 1 exists in a single version 102. And the document named MyFile 2 exists in two versions 103 and 104. Thus, these three documents comprise five different document versions. It is understood that although not necessary to the invention, a project identifier is also sent to computer 60 when creator 56 uploads a document version.

When a proofer requests a document version, the URL is assembled by combining the protocol and host "<protocol>://<host>" together with the directory tree structure assembled from the information about the document version "<client>/<version>/<name>". The complete URL takes the form "<protocol>://<host>/<client>/<project>/<version>/<name>/". Other specific forms are possible for the URL, but by setting up the directory tree with some information about the document and by formulating the URL from the directory tree, the URL also provides information about the document. This makes the system easier to navigate and confirms to the proofer or user that she has obtained the document version she requested.

Figure 4:
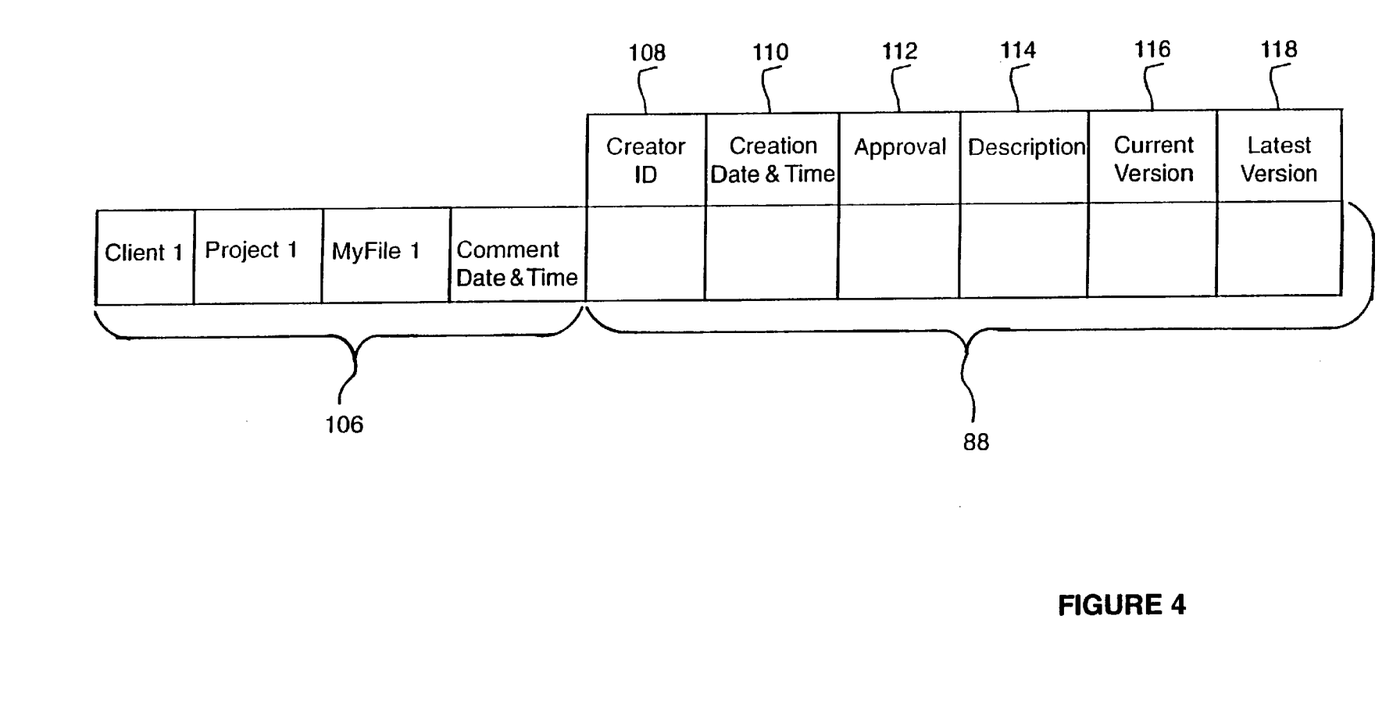
FIG. 4 is a schematic diagram illustrating organization of database records for documents in a proofing system of FIG. 1.

Referring now to FIG. 4, database records 88 include additional information about each document version. In a manner similar to the creation of the directory tree, unique records are created for each unique combination of <client>, <project>, <name> and <comment date & time> which forms a tag 106 for the record. Other unique tags could be used while still achieving the advantage that the tags, directory tree and URL for a document version include related information.

The types of information stored in records 88 for each unique tag 106 include creator identifier 108, creation date and time 110, approval status 112, document description 114, current version number 116 and latest version number 118. Creator identification 108 is used e.g., to send notices 74 (see FIG. 2) to creators 56. Approval status 112 is a switch used to set the approval command for triggering a proof 71 (see FIG. 1). Latest version 118 is used to assign version numbers to new document versions, and current version is set by a version command issued by an authorized user.

Each of the fields in tag 106 are index keys to records 88. In this respect a user of system 50 can access the various client directories to which he is assigned to view and comment on the various documents in various projects. Once a proofer/user selects which document version(s) to review, system 50 pastes together as a string the <client>, <project>, <name>, and <version> from the tag and record to assemble on the fly a URLpath to the requested document on database 64. Once located, the document version(s) are formatted for display together with the description(s) and any comments.

In operation, an electronic document, preferably in a portable format, is uploaded to a private account on a remote server by the document sender. The document recipient may be informed that the portable document is being held on the server by generic notification, or the recipient may not receive notification. The document recipient logs into the private account on the computer network with a username and password, and is informed that the latest version of a document is ready for proofing. Previous versions of the electronic document are also available for reference and comparison, in the event a user wishes to select them. The recipient views the electronic documents, along with information pertinent to that document version such as a document description, the name of the document creator, when the document was sent to the server, and comments from the document creator, for display on his or her computer.

Upon viewing and/or proofing the document, the system allows the recipient or recipients to relay their comments and decision on the document version back to the server where the document creator may access it. In this way, the document is displayed to the proofreader, who then comments on the document version, and submits comments back to the document sender. Additionally, the document sender and the document recipient may choose to simultaneously view multiple versions of the same document to proof on their computer screens, facilitating document version comparison.

The primary purpose of the invention is to facilitate electronic document distribution, proofing and communication between a document creator and a person or people responsible for approving the document or those who require final receipt of finished documents. In preferred embodiments, the invention is used for proofing multiple versions of documents with multiple proofreaders in a controlled management system over a computer network such as the Internet or a corporate intranet. A preferred embodiment of the invention uses a network of servers including a Web server, an application server, a database server, and an email server—together known as a "server cluster." Working in concert, the server cluster will store, manage, route, distribute, and track documents and relevant information about those documents from a document creator to a document proofer or proofers, and then back to the document creator in a document proofing cycle which culminates when a document is approved and deemed ready for output or for final electronic distribution.

The invention stores document versions as they are uploaded to the server cluster in chronological order. On demand, the document creator can make a prior version of an electronic document being stored on the server the "current" document available for access and comments by the document creator or others. The ability to make a prior version of a document stored on the server the "current" version prevents confusion as to which version of a document is currently considered the active working version of the document in a proofing cycle. Designating a previous version, out of chronological order, as "current" maintains order for multiple document recipients in a document management system with multiple versions of the same electronic document.

Once an electronic document has been proofread by one or more proofreaders charged with approving a document, the file is ready for distribution in either electronic or print form. Frequently, the creation of hard copy documents from electronic files involves a party other than the document designer or the document proofreaders. For instance, if a document has been proofed and approved and now needs to be turned into a full color book, bound, and shrinkwrapped for final distribution to its intended audience, a printing company may be hired to output the final version of the electronic file on special printing machinery. The electronic proofing and distribution system permits an approved document to be retrieved from the system by an authorized third party.

An example of how the preferred embodiment of the invention could be used in a document proofing and distribution workflow follows: Roger is a graphic designer at ABC Graphics & Design, Inc., located in New York City. Roger is hired by Gail of XYZ Music Corporation in Los Angeles, to design and produce a CD-ROM cover for a new product her company is introducing. After their discussions, Roger works on creating an initial version of the CD-ROM cover to show Gail and two of her colleagues.

Like most graphic designers, Roger creates the artwork and printing mechanical for the CD-ROM cover on a computer, using a variety of software applications. Rather than print a hardcopy proof CD-ROM cover and send it by overnight courier to XYZ Music, Roger decides to use system 50 of the invention to electronically proof multiple versions of the CD-ROM cover with Gail and two other people at XYZ Music who need to approve the final design.

Roger converts his electronic files into a portable file format and uploads his designs into ProofNet™ the commercial embodiment of the invention. When Roger first set up usernames, passwords, and permissions for Gail and her associates, they all received the Internet address (URL), username and passwords needed to log into ProofNet™ using their computers. Upon upload of the documents, the proofreaders at XYZ Music receives notification by email that a proof is waiting for them to examine on the Proof-Net™ system.

Using the preferred embodiment of the invention Gail and her colleagues at XYZ Music log into their accounts at different times to examine on their screens and print on their own laser and color printers the first version of the CD-ROM cover artwork that Roger has sent to them. As they view the artwork on their computer screens, they also see information about the document version they are viewing, such as who sent it to them, the date and time it was posted to the server, the name and number of the version, and comments from Roger, the document creator.

After proofing the screen image of the document, and, optionally, the printed versions that the XYZ Music staff received through the ProofNet™ system, each individual at XYZ Music is given the opportunity to send comments on the document version back to Roger. XYZ Music staff members type their comments into the window where they also see the document displayed. XYZ Music staff members click a submit button to send their comments on the document version to Roger, who receives notice that his document has been viewed and commented on, either by email or by examining his Inbox, part of the ProofNet™ system.

Roger can access the comments sent back to him by his XYZ clients and view these comments in the same window as the proof commented on. Roger has the option to respond with new comments, or to upload into the ProofNet™ system a new version of the document which takes into account the suggestions and instructions of his clients at XYZ Music. If Roger uploads a new version of the document into the server, his clients at XYZ Music are alerted either by email or by logging into the system and checking their inboxes.

Because there are now at least two versions of the same document on the server, the XYZ Music staff can have the ProofNet™ system display one or more of the document versions onscreen at the same time to facilitate version comparison. Roger can also ask the ProofNet™ system to display one or more versions of the document on his screen for comparison.

Perhaps after the fourth version in the document proofing workflow, the XYZ Music clients ask Roger to go back and make the second version the "current" version, as this version best reflects their idea of how the artwork should look. The ProofNet™ system has the ability to make a prior version of the document the "current" version so that everyone at XYZ Music and ABC Design knows where the proofing workflow cycle stands and works on the same document.

The proofing cycle is concluded when the XYZ Music staff indicates through the system that a version is acceptable as the final version of the document. After a document has received approval as the final version, the proofing cycle is complete and the final version of the document remains on the server as current, with all the other versions.

At this point, a third party might be brought into the CD-ROM cover production process. For example, because Roger's company, ABC Graphics & Design, was hired to design and produce the CD-ROM cover for final delivery of the CD-ROM covers to XYZ Music's distribution center in St. Louis, it is now the responsibility of ABC Graphics & Design to find a printer, preferably in St. Louis, to print the CD-ROM covers and deliver them to the XYZ distribution center.

When ABC Graphics secures a printer in St. Louis who can handle the job, it is Roger's responsibility to deliver the electronic file of the completed and approved CD-ROM cover to the printer's facility. The printer then uses their computer to send the electronic file for output on special printing machinery to generate the required number of CD-ROM covers.

Ordinarily, Roger would have to physically mail the electronic file on computer media such as a floppy disk or Zip cartridge to the printer by courier. However, because the approved file is stored on the ProofNet™ server, Roger can provide the printer access to the file on the ProofNet™ server for retrieval over the Internet. The printer can be assigned a username and password to securely access the file for transfer to his/her computer. The printer retrieves the file from the server, along with printing instructions from Roger, then sends the approved proof of the color CD-ROM covers for output. After the file has been retrieved from the Proof-Net™ system, Roger receives verification that the file was delivered to the printer. This completes the production cycle.

Although the electronic document proofing system and its methods of use are described herein in connection with use on the Internet, the invention may be applied to any of a wide variety of networks, including internets, intranets, LANs and WANs, or any combination thereof, as desired. As well, the invention may be applied to a wide variety of computer platforms, communication protocols, portable document formats, page description languages, markup languages or any combination thereof, as desired.

Although the present invention has been described in detail with reference to a particular preferred embodiment, persons possessing ordinary skill in the art to which the invention pertains will appreciate that various modifications and enhancements may be made without departing from the spirit and scope of the claims that follow.

What is claimed is:

1. A system for proofing electronic documents delivered over a network, comprising:
   a plurality of electronic documents in portable document file format;
   a computer connectable to the network for receiving the plurality of portable format documents together with at least one associated proofer identifier;
   a program executing on said computer for assigning a version number to each of the plurality of received portable format documents; and
   a database accessible by said computer for storing the documents and associated version numbers;
   said computer for receiving a request, from a proofer presenting the proofer identifier, to review multiple versions of a portable format electronic document;
   said program for retrieving and formatting the requested multiple document versions for simultaneous display to permit visual comparison.

2. The system of claim 1 in which the network is the internet.

3. The system of claim 2 in which said program sends an email each time a new document version is received, notifying the proofer that it is available for review.

4. The system of claim 2 in which said computer includes a webserver program for publishing document versions to proofers.

5. The system of claim 4 in which said computer executes scripts permitting the proofer to request information from said database through the webserver program.

6. The system of claim 4 in which said computer executes scripts which interpret commands entered by the proofer.

7. The system of claim 1 in which said computer receives comments from proofers concerning the document versions, and in which said program stores the comments in said database together with the corresponding document version.

8. The system of claim 7 in which said computer formats a history of received comments for display together with a document version.

9. The system of claim 1 wherein said program retrieves records corresponding to each of the requested document versions and assembles URLs pointing toward the documents from data in the records.

10. A system for proofing electronic documents delivered over a network, comprising:
    a database of portable format electronic documents stored together with at least one proofer identifier;
    a computer connectable to the network for receiving a plurality of comments, each concerning a particular one of the portable format documents; and
    a program executing on said computer for associating and storing the received plurality of comments together with the particular portable format electronic documents;
    said computer for receiving a request, from a proofer presenting the proofer identifier, to review a particular portable format electronic document;
    said program for retrieving and formatting the requested document together with the associated plurality of comments for simultaneous display to permit review.

11. The system of claim 10 in which at least some of the plurality of comments are received by said computer together with a proofer identifier.

12. The system of claim 10 in which at least some of the plurality of comments are received by said computer together with a creator identifier.

13. The system of claim 10 in which the network is the internet.

14. The system of claim 13 in which said program sends an email each time a new comment version is received, notifying the proofer that it is available for review.

15. The system of claim 10 in which said program retrieves and formats multiple versions of a requested document together with the associated plurality of comments for simultaneous display to permit visual comparison and review.

16. The system of claim 10 wherein said program retrieves a record corresponding to the requested document and assembles a URL pointing toward the document from data in the record.

17. A system for proofing electronic documents delivered over a network, comprising:
    a plurality of electronic documents in portable document file format:
    a computer connectable to the network for receiving the plurality of portable format documents together with at least one associated proofer identifier;
    a program executing on said computer for assigning a version number to each of the plurality of received portable format documents; and
    a database accessible by said computer for storing the documents and version numbers;
    said computer for receiving a request, from a proofer presenting the proofer identifier, to review a portable format electronic document;
    said program for retrieving and formatting a current version of the requested document for display;
    said computer for receiving a version command from a proofer presenting the proofer identifier;
    said program for interpreting the version command to replace the current version of the document with a different version of the portable format electronic document;

wherein said program retrieves and formats multiple versions of the requested document for simultaneous display.

18. The system of claim 17 in which said computer receives comments from proofers concerning the document versions, and in which said program stores the comments in said database together with the corresponding document version.

19. The system of claim 18 in which said computer formats a history of received comments for display together with a document version.

20. The system of claim 17 in which the network is the internet and in which said computer includes a web server program.

21. A system for proofing electronic documents delivered over a network, comprising:

a plurality of electronic documents in portable document file format;

a computer connectable to the network for receiving the plurality of portable format documents together with at least one associated proofer identifier;

a program executing on said computer for assigning a version number to each of the plurality of received portable format documents; and a database accessible by said computer for storing the documents and associated version numbers;

said computer for receiving a plurality of comments, each concerning a particular one of the portable format document versions;

said computer for receiving a request, from a proofer presenting the proofer identifier, to review multiple versions of a portable format electronic document;

said program for retrieving and formatting the requested multiple document versions for simultaneous display together with corresponding comments to permit visual comparison;

said computer for receiving a version command from a proofer presenting the proofer identifier;

said program for interpreting the version command to replace the current version of the document with a different version of the portable format electronic document.

* * * * *